Aug. 30, 1938.                    J. F. CULLIN                    2,128,454
                      WINDSHIELD WIPER BLADE CONSTRUCTION
                              Filed July 18, 1934

INVENTOR.
Jasper F. Cullin.
BY
Harness, Dickey, Pierce & Hann
ATTORNEYS.

Patented Aug. 30, 1938

2,128,454

UNITED STATES PATENT OFFICE 2,128,454

WINDSHIELD WIPER BLADE CONSTRUCTION

Jasper F. Cullin, Detroit, Mich.

Application July 18, 1934, Serial No. 735,782

20 Claims. (Cl. 15—250)

This invention relates to windshield wiper blades and the principal object is the provision of such a blade which has certain new and novel features of construction, that is efficient in operation and is economical to produce.

Objects of the invention include the provision of a windshield wiper blade construction wherein a single ply of rubber or like material may be employed as the wiping element with all of the advantages thereof and yet eliminate the main disadvantages heretofore present in such types of blades; the provision of a windshield wiper blade construction of the single ply wiper element type so constructed and arranged as to obtain certain desirable advantages heretofore obtainable only in the multiple ply wiper element types of blades; the provision of a single ply wiper element type of windshield wiper blade in which the heretofore liability of breaking off of the wiper element at the edge of the channel, due to continued flexing along such line, is substantially eliminated; the provision of a windshield wiper blade construction wherein the maintenance of a perfectly straight wiping edge on the flexible element is readily possible; the provision of a windshield wiper blade so constructed and arranged that it will conform to irregularities in the surface of the windshield over which it operates; and the provision of a single ply wiper element type of windshield wiper blade so constructed and arranged that the usual tendency of such blades to chatter in operation is definitely eliminated.

Other objects include the provision of a windshield wiper blade including a channel-like backing member and a flexible wiping element loosely associated therewith; the provision of a windshield wiper blade including a channel-sectioned backing member and a flexible wiping element received therein and mounted for bodily movement in all directions with respect thereto; the provision of a windshield wiper blade structure including a backing member and a flexible wiping element so supported thereby as to be capable of bodily shiftable movement with respect thereto in all directions; the provision of a windshield wiper blade construction including a backing member and a cooperating flexible wiping element so constructed and arranged with respect to the backing element as to permit it to yield both in the normal plane of the wiping element and transversely thereto to permit it to accommodate itself to unevenness in the surface of the windshield being operated upon.

Further objects of the invention include the provision of a windshield wiper blade including a backing member of channel section and a flexible wiping element received within the channel thereof, the wiping element being provided with apertures therethrough, and means carried by the backing member projecting loosely through said apertures so as to permit said wiping element to bodily shift relative to said backing member in operation; the provision of a windshield wiper blade structure including a backing member of generally channel section and a flexible wiping element loosely received therein and movable perpendicular with respect to the plane of the sides of said channel, the wiping element having apertures therein and tongues being struck out from said backing member and projecting loosely through said apertures whereby to connect said backing member and said element together for limited bodily movement of one with respect to each other; the provision of a windshield wiper blade including a generally channel sectioned backing member and a flexible wiping element, one edge of said flexible wiping element being received within said backing member and being thickened along said edge, the backing member being formed for cooperatively engaging said thickened edge whereby to loosely retain said wiping element within said backing member.

The above being among the objects of the present invention, the same consists in certain novel features of construction and combinations of parts to be hereinafter described with reference to the accompanying drawing, and then claimed, having the above and other objects in view.

In the accompanying drawing which illustrates suitable embodiments of the present invention and in which like numerals refer to like parts throughout the several different views, Figure 1 is a fragmentary sectional view taken centrally through the windshield of a motor vehicle and showing a windshield wiper mechanism operatively associated therewith.

Figure 1:
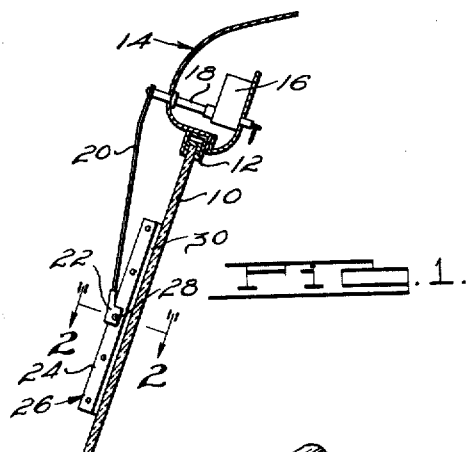

Windshield wiper blades may be classified under two general heads, one of which is known as the single ply type in that it employs a single flexible wiping element of a single thickness and the other of which may be classified as the multiple ply type and which employs a flexible wiping element made up of a plurality of relatively thin ply integrally or otherwise joined together along one edge only or otherwise maintained in operative relation with respect to each other in the cooperating backing member. Each of these types as conventionally constructed has certain advantages and disadvantages not present in the other type. For instance, in the single ply type the advantages are that the flexible wiping element is rigid and not easily broken down by continued pressure on the wiper arm, there is no chance of snow to get between plies and ball up thereby raising the blade off of the windshield glass, there is no chance of dirt or grit to accumulate between plies and scratch the glass, or chance for road oil to get between the plies and be continually redeposited upon the glass, it is cheap to manufacture and it is more desirable where higher arm pressures are available. On the other hand, the single ply blades as differentiated from the multiple ply blade have the disadvantage that the flexible wiping element is liable to break off at the channel or backing member due to continued flexing at this point, it is harder to maintain a perfectly straight edge due to the tendency of the wiping element to take a set when exposed to the weather and under pressure, it is difficult to make a single ply wiping element conform to slight irregularities in modern windshield glass, it is harder to maintain a perfectly straight wiping edge under extremely light spring pressure, it requires more power to operate than the multiple ply type, and it has a tendency to chatter under other than ideal operating conditions.

While the use of the present invention is not limited to a single ply wiper element and a multiple ply element may be employed particularly if the various plies thereof are secured together along that edge received within the backing member, it is particularly applicable to the single ply type in that by its use all of the advantages and economies of the single ply type are obtained and substantially all of the disadvantages thereof as existing in conventional types of single ply wiper blades are eliminated. In the practice of the present invention the conventional type of wiper blade backing element may be employed, that is, a backing member formed from a strip of metal and bent into a substantially U section so as to receive the flexible wiping element therebetween. In accordance with the present invention, however, instead of clamping the flexible wiping element securely within the backing element by compressing the sides of the backing element into contact therewith, a material amount of clearness is provided between the inner side walls of the backing member and the side walls of the wiping element, and the wiping element is so mounted in the backing member that it may move bodily between the side walls of the backing member. This allows the wiping element to flex over its entire width and length. Preferably the form of connection between the wiping element and the backing member is such as to permit the wiping element to have bodily movement in the normal plane thereof, in other words, in and out with respect to the backing member so as to permit it to flex over its length and in the direction of its thickness thereby to permit it to more readily conform to irregularities in the glass over which it is operated.

Referring now to the accompanying drawing, there is illustrated in Fig. 1 a motor vehicle windshield 10 provided with the usual encompassing frame 12 and having the usual vehicle body header construction indicated generally at 14 at its upper edge. A windshield wiper motor 16 is suitably mounted in the header 14 in accordance with conventional practice, its shaft 18 projecting forwardly therethrough and being provided at its forwardly projecting end with a resilient windshield wiper arm 20 which may be of any conventional construction. In the present case the free end of the arm 20 is provided with a wiper blade attaching member 22 which straddles the backing member 24 of the windshield wiper blade, indicated generally at 26, and is pivotally secured thereto by means of a pin 28 which permits the blade 26 to pivot in the general plane of its thickness and thereby permit the blade 26 to adjust itself to the angularity of the windshield 10 as compared to the arm 20. As is well understood, the windshield motor 16 causes the shaft 18 to oscillate, thereby causing the arm 20 to oscillate and cause the wiper blade 26 to be oscillated back and forth across the outer surface of the windshield 10.

Figure 2:
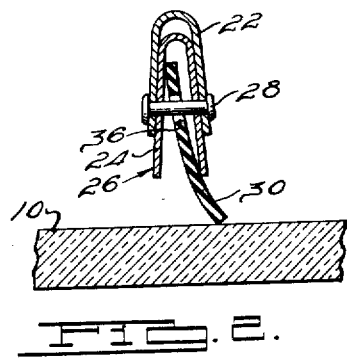
Fig. 2 is an enlarged fragmentary sectional view taken transversely through the windshield wiper blade shown in Fig. 1 as on the line 2—2 thereof, through the point of connection of the windshield wiper blade and arm.
Figure 3:
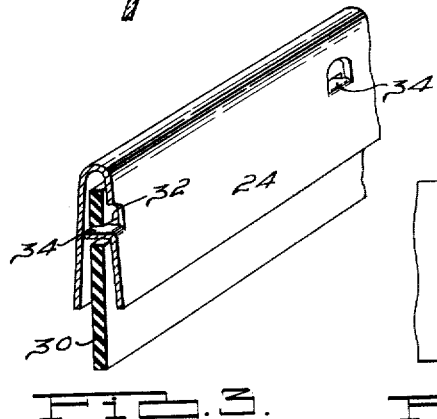
Fig. 3 is an enlarged, fragmentary, perspective view of the windshield wiper blade shown in Figs. 1 and 2.

Referring now to Fig. 2 it will be noted that the backing member 24 is of generally U-shaped section or channel formation and preferably the free edges of the channel are spaced apart by a greater distance than the side walls adjacent their point of connection at the bottom of the channel. In other words the sides of the channel preferably taper outwardly towards the open edge thereof. Within the backing member 24 is received the flexible wiping element 30 which may be formed of rubber as in conventional constructions or any other suitable material having characteristics suitable for the purpose desired. The element 30 is shown as formed of a single strip of material and of a length commensurate with the length of the backing member 24. As will be noted, the thickness of the strip 30 is considerably less than the width of the channel in the backing member 24.

Figure 4:
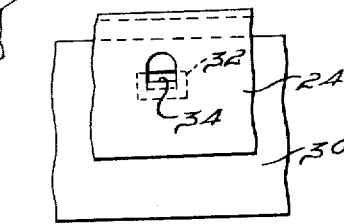
Fig. 4 is a fragmentary side elevational view of the windshield wiper blade on the same scale as in Figs. 2 and 3.

As illustrated in Fig. 4, in order to maintain the wiping element 30 within the backing member 24, that portion of the wiping element 30 received within the backing member 24 is provided with a plurality of longitudinally spaced apertures 32 therein, and lugs 34 are struck out from one side of the backing member 24 at corresponding intervals along its length and each lug 34 projects through one of the apertures 32 and extends into proximity to the opposite side of the backing member 24. It is to be particularly noted and as best brought out in Fig. 4 that the dimensions of the apertures 32 are considerably greater than the cross-sectional dimensions of the lugs 34 so that the lugs 34 are relatively loosely received within the apertures 32. At the same time it will be noted from an inspection of Fig. 2 that at the point where the pin 28 projects through the backing member 24 and wiping element 30 the wiping element is provided with an enlarged opening 36 providing the same general amount of clearance between the pin 28 and the walls of the opening 36 as is provided between the lugs 34 and the walls of the apertures 32.

It will be apparent that in the above described structure the wiping element 30 has ample clearance between the side walls of the channel within the backing member 24 so as to permit it to bodily shift backwardly and forwardly between the side walls of the channel and at the same time because of the clearance between the lugs 34 and the walls of the apertures 32 the wiping element 30 may shift bodily in the normal plane of its thickness in any direction. The result of this construction is that as the blade 26 is oscillated back and forth across the surface of the windshield 10 and is resiliently pressed against the windshield 10 by the tension of the arm 20, the wiping element 30 will be caused to bend over its full length under the drag exerted by the friction between the element 30 and the windshield 10 instead of immediately adjacent the open edge of the channel of the backing member as in conventional constructions. As previously mentioned, the flexing of the element 30 in conventional constructions is localized at the open edge of the channel of the backing member and consequently premature rupture of the wiping element along this line therefore occurs. With the present construction, by distributing the bending of the element 30 over its full width, no localization of bending stresses occurs and added length of life is imparted to the wiping element. Additionally, because of the clearance provided between the side walls of the channel in the backing member and the side surfaces of the element 30, the element 30 may flop back and forth within the backing member 24 upon each reversal of the direction of oscillation of the wiper blade, thus enabling a more effective wiping operation even though the connection between the wiper arm and the blade may be of the type illustrated in Fig. 2 which prevents such flop of the blade assembly 26 relative to the head 22 upon reversal in the direction of oscillation of the blade. Because the wiping element 30 is floatingly associated with the backing member 24, it has been found that its period of vibration has been reduced to such an extent that it will not chatter even under the most adverse conditions. Additionally, because the wiping element may move bodily in and out with respect to the channel in the backing member, it has been found that it will flex in the plane of its thickness over its length so as to adjust itself to irregularities in the surface of the glass over which it operates and, accordingly, will always be in contact with the glass over its full length. In windshield wiper blades as conventionally constructed, if the backing member or channel becomes bent, as often occurs from forcing the blade across the windshield while the wiper is not operating as is done when washing the windshield, the wiping action of the blade is seriously interfered with and it is often necessary to replace it. It has been found that such bending of the channel of a blade constructed in accordance with the present invention will have very little effect on the proper functioning of the same unless the amount of bending is extreme.

Figure 5:
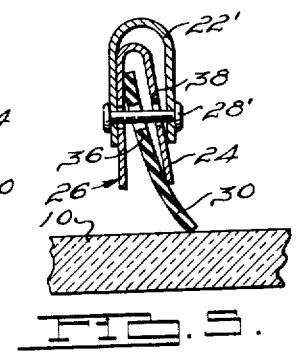
Fig. 5 is a transverse sectional view taken through a modified form of windshield wiper blade construction.

It is, of course, possible to permit the entire wiper blade assembly 26 to flop upon reversal of direction of oscillation as in conventional constructions instead of the only wiper element 30 as illustrated in Fig. 2. Such a construction is illustrated in Fig. 5 in which it will be noted that the wiper arm connection member 22 is made wider than in Fig. 2 so that the backing member 24 may flop back and forth therein. In this case it will be noted that the openings 38 in the backing member 24 for the passage of the pivot pin 28' are made of sufficient size as not to restrict such flopping action of the backing member 24. Accordingly, in this construction the pin 28' has clearance with respect to both the openings 38 in the backing member 24 and the opening 36 in the wiper element 30. Obviously, a similar connection may be employed between the wiping element 30 and the backing member 24 instead of the lugs 34 in the previously described construction and the same effect will be obtained as in the previously described construction.

Figure 6:
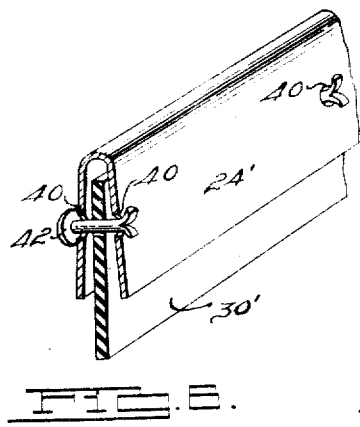
Figs. 6, 7 and 8 are fragmentary perspective views of modified forms of windshield wiper blade constructions.

In Fig. 6 a construction is shown wherein the backing member 24', instead of having lugs such as 34 struck out from the side walls thereof as in the previously described construction is provided with transversely aligned openings 40 at spaced intervals in its length. Split rivets 42 are projected through the backing member 24' through each pair of aligned openings 40 to maintain the wiping element 30' in position. In this case the rivets 42 are more closely received in the wiping element 30' than in the construction previously described and have ample clearance between themselves and the walls of the openings 40 to permit the bodily movement of the wiping element previously described.

Figure 7:
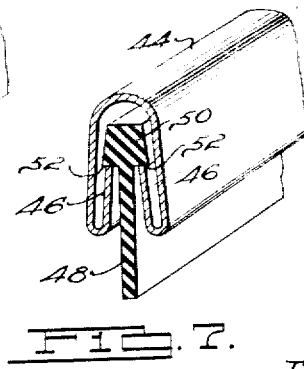

In Fig. 7 another modified form of construction is shown. In this case the backing member 44 is formed from a strip of metal into a generally channel-shaped section but the free edge portions 46 thereof are reversely bent inwardly upon themselves so as to project inwardly into the channel, and terminate preferably approximately midway of the depth of the channel. Preferably, the portions 46 are slightly inwardly spaced from the side walls of the backing member as indicated in Fig. 7. The flexible wiping element 48 in this case has that edge thereof confined within the backing member thickened as at 50 so as to provide a pair of shoulders 52 facing toward the open side of the channel. The width of the portion 50 is greater than the spacing of the free edges of the portions 46 although such spacing is greater than the thickness of the main body portion of the wiper element 48. The thickened edge 50 is received within the channel of the backing member 44 and it is of such dimensions that it is bodily movable within the backing member although retraction of the wiping element 48 in the direction of the open side of the channel of the backing member is prevented by interengagement of the shoulders 52 with the inner edges of the portions 46. Any suitable means may be provided for limiting lengthwise movement of the element 48 with respect to the backing member 44 such, for instance, as the pivot pin employed for connecting the wiper assembly to the wiper arm, as previously described. As will be apparent, all of the advantages of the previously described constructions are present in the construction illustrated in Fig. 7, but in view of the fact that the element 48 may be removed from the channel 48 upon removal of the pivot pin mentioned, this construction permits ready replacement of the element 48 only in service, thus effecting an economy in this direction.

Figure 8:
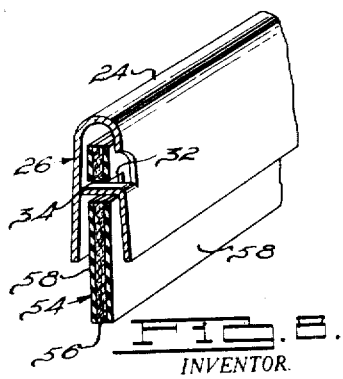

In Fig. 8 is shown a modification of the wiper element as applied to the type of structure shown in Figs. 1 to 4, inclusive. In this case the wiping element 54 is of the flexible nature desirable in such cases but instead of being formed entirely of one type of material, it is formed in three layers, all of which are preferably intimately bonded to one another. In this case the wiper element 54 is made up of a central layer or strip 56 of felt and outer layers 58 of rubber or like material, this particular combination having certain advantages in wiping action not found in blades formed wholly of rubber.

Those skilled in the art will readily perceive various other changes and modifications in the constructions shown upon recognition of the principles of the invention herein disclosed and, accordingly, it will be understood that formal changes may be made in the specific embodiments of the invention described without departing from the spirit or substance of the broad invention, the scope of which is commensurate with the appended claims.

What I claim is:

1. A windshield wiper blade comprising a unitary assembly of parts including a backing member and a flexible wiping element, said wiping element having greater width than thickness and being loosely connected to said backing member so as to be bodily shiftable in the direction of its thickness with respect to said backing member.

2. A windshield wiper blade comprising a unitary assembly of parts including a backing member and a flexible wiping element, said wiping element having greater width than thickness and being loosely connected to said backing member so as to be bodily shiftable in the direction of its width with respect to said backing member.

3. In a windshield wiping blade construction, in combination, a backing member, a wiping element, and means loosely connecting said wiping element and said backing member together to provide for flexing of said wiping element substantially throughout its width and length.

4. In a windshield wiper blade construction, in combination, a channel-shaped backing member, and a flexible wiping element movably retained in the channel of the backing member, the two being so constructed and arranged that said wiping element may shift bodily between the side walls of said backing member.

5. A windshield wiper blade comprising, in combination, a channel-sectioned backing member, a flexible wiping element received in said backing member and of a size to be bodily shiftable therein between the side walls of said channel, and means for retaining said wiping element against withdrawal from said channel while permitting the aforementioned movement thereof.

6. A windshield wiper blade construction comprising, in combination, a rigid backing member provided with a channel therein, a flexible wiping element having a portion received within said channel and bodily shiftable between the side walls thereof, and means connecting said wiping element and backing member to provide for flexing throughout said portion of said wiping element within said channel member.

7. A windshield wiper blade comprising, in combination, a sheet metal backing member of channel section, a wiping element loosely received within said backing member, and means loosely connecting said backing member and said wiping element together permitting relative bodily movement between them.

8. A windshield wiper blade construction comprising, in combination, a sheet metal backing member of channel section, a flexible wiping element loosely received within the channel of said backing member, said wiping element having a plurality of longitudinally spaced apertures therein, and means secured to said backing member projecting through said apertures in loosely associated relation with respect thereto.

9. A windshield wiper blade comprising, in combination, a U-shaped backing member, a flexible wiping element loosely received within said backing member, said wiping element having a plurality of longitudinally spaced apertures therein, and lugs struck from the side walls of said backing member projecting through said apertures in loosely associated relation with respect thereto.

10. A windshield wiper blade comprising, in combination, a U-sectioned backing member, a flexible wiping element loosely received within said backing member, said backing member having a plurality of longitudinally spaced laterally aligned openings therein, and pins projecting through said openings in loose relation with respect thereto and passing through said wiping element.

11. A windshield wiper blade construction comprising, in combination, a U-sectioned backing member having a plurality of longitudinally spaced openings in the side walls thereof, the openings on one side matching with corresponding openings on the other side thereof, a flexible wiping element relatively loosely received within said backing member and having a plurality of longitudinally spaced apertures therein spaced in accordance with the spacing of said apertures in said backing member, and pins projecting through the aperture in both said backing member and said wiping element and having clearance with respect to both thereof.

12. A windshield wiper blade comprising, in combination, a hollow backing member having an elongated slot leading into the interior thereof, said slot being of less width than the interior width of said member, and an elongated flexible wiping element comprising a thickened edge portion and a main body portion, said edge portion being of greater thickness than the width of said slot and said main body portion being of less thickness than the width of said slot, said thickened edge being loosely received within said body member and said main body portion being loosely received in said slot and projecting outwardly therefrom.

13. A windshield wiper blade structure comprising, in combination, an elongated channel sectioned backing member having free edge portions thereof bent inwardly to form a pair of shoulders spaced from the bight of the backing member, and an elongated wiping element having a thickened edge and a main body portion, said thickened edge being loosely received in the channel of said member and being engageable with said shoulders to prevent withdrawal of said element from the open side of said channel, and said main body portion being loosely confined between said shoulders.

14. A wiper blade comprising a holder, and a one-piece wiping strip, the holder being of channeled formation, and the wiping strip having a marginal enlargement received in the channel of the holder for bodily pivotal movement, the sides of the holder being bent inwardly to form shoulders to support the marginal enlargement to hold its strip within the channel, said shoulders being normally spaced outwardly from said marginal enlargement to permit in and out movement of the strip between the shoulders.

15. A wiper comprising a holder, and a formed wiping strip, the holder being channeled and the wiping strip having a marginal enlargement pivotally received in the channel of the holder, the sides of the holder being provided with shoulders extending inwardly over the marginal enlargement to hold the strip within the channel, such shoulders being normally spaced outwardly from said marginal enlargement, the sides of the holder outwardly beyond such shoulders being spaced from the wiping strip to define stops for limiting the bodily pivotal movement of the strip about an axis disposed within the channel inwardly of such shoulders.

16. A windshield wiper blade including, in combination, a flexible wiping element, a backing member enclosing a marginal edge of said wiping element, said wiping element having a preformed opening therein, and said backing member having a projection on one side thereof abutting the opposite side thereof to limit the minimum spacing of the side portions of said backing member to a distance greater than the thickness of said wiping element, said projection loosely passing through said opening in said wiping element.

17. A windshield wiper blade comprising, in combination, a flexible wiping element, a relatively rigid backing member enclosing a marginal edge of said wiping element, said wiping element having a plurality of preformed openings therein, and a plurality of inwardly extending projections formed on at least one side of said backing member in complementary relation with respect to said openings, said projections being received in said openings and serving to limit the minimum spacing of the side portions of said backing member to a distance greater than the thickness of said wiping element, and being of a smaller size than the cooperating opening in said wiping element whereby to permit a limited amount of free bodily movement of said wiping element in said backing member.

18. A wiper blade comprising in combination a flexible wiping member, and a preformed backing member therefor of generally channel shape having spaced walls between which said wiping member is received, one of said members having a plurality of inwardly extending projections distributed along the length thereof, and the other of said members having a plurality of recesses distributed along the length thereof to receive said projections, said projections and recesses loosely interfitting so as to permit said wiping member to move bodily in said backing member.

19. A wiper blade comprising in combination a flex'ble wiping member, and a backing member therefor of generally channel shape having spaced walls between which said wiping member is received, one of said members having a plurality of inwardly extending projections distributed along the length thereof, and the other of said members having a plurality of recesses distributed along the length thereof to receive said projections, said recesses and projections being so proportioned with respect to each other as to provide a sloppy fit therebetween, permitting said strip to have limited flexing movements within said backing member.

20. A wiper blade comprising in combination a flexible wiping strip, a backing member for said strip of generally channel shape having spaced sides between which said strip is received, at least one side of said backing member having a plurality of projections extending inwardly thereof, and distributed along the length thereof, and said strip having a plurality of openings therein distributed along the length thereof to receive said projections, said projections and openings loosely interfitting so as to permit said strip to move bodily in said backing member.

JASPER F. CULLIN.

---

CERTIFICATE OF CORRECTION.

Patent No. 2,128,454.   August 30, 1938.

JASPER F. CULLIN.

It is hereby certified that error appears in the printed specification of the above numbered patent requiring correction as follows: Page 2, first column, line 68, for the word "clearness" read clearance; page 3, first column, line 74, for the reference numeral "22" read 22'; and that the said Letters Patent should be read with this correction therein that the same may conform to the record of the case in the Patent Office.

Signed and sealed this 11th day of October, A. D. 1938.

Henry Van Arsdale

Acting Commissioner of Patents.

(Seal)

pivotally received in the channel of the holder, the sides of the holder being provided with shoulders extending inwardly over the marginal enlargement to hold the strip within the channel, such shoulders being normally spaced outwardly from said marginal enlargement, the sides of the holder outwardly beyond such shoulders being spaced from the wiping strip to define stops for limiting the bodily pivotal movement of the strip about an axis disposed within the channel inwardly of such shoulders.

16. A windshield wiper blade including, in combination, a flexible wiping element, a backing member enclosing a marginal edge of said wiping element, said wiping element having a preformed opening therein, and said backing member having a projection on one side thereof abutting the opposite side thereof to limit the minimum spacing of the side portions of said backing member to a distance greater than the thickness of said wiping element, said projection loosely passing through said opening in said wiping element.

17. A windshield wiper blade comprising, in combination, a flexible wiping element, a relatively rigid backing member enclosing a marginal edge of said wiping element, said wiping element having a plurality of preformed openings therein, and a plurality of inwardly extending projections formed on at least one side of said backing member in complementary relation with respect to said openings, said projections being received in said openings and serving to limit the minimum spacing of the side portions of said backing member to a distance greater than the thickness of said wiping element, and being of a smaller size than the cooperating opening in said wiping element whereby to permit a limited amount of free bodily movement of said wiping element in said backing member.

18. A wiper blade comprising in combination a flexible wiping member, and a preformed backing member therefor of generally channel shape having spaced walls between which said wiping member is received, one of said members having a plurality of inwardly extending projections distributed along the length thereof, and the other of said members having a plurality of recesses distributed along the length thereof to receive said projections, said projections and recesses loosely interfitting so as to permit said wiping member to move bodily in said backing member.

19. A wiper blade comprising in combination a flex'ble wiping member, and a backing member therefor of generally channel shape having spaced walls between which said wiping member is received, one of said members having a plurality of inwardly extending projections distributed along the length thereof, and the other of said members having a plurality of recesses distributed along the length thereof to receive said projections, said recesses and projections being so proportioned with respect to each other as to provide a sloppy fit therebetween, permitting said strip to have limited flexing movements within said backing member.

20. A wiper blade comprising in combination a flexible wiping strip, a backing member for said strip of generally channel shape having spaced sides between which said strip is received, at least one side of said backing member having a plurality of projections extending inwardly thereof, and distributed along the length thereof, and said strip having a plurality of openings therein distributed along the length thereof to receive said projections, said projections and openings loosely interfitting so as to permit said strip to move bodily in said backing member.

JASPER F. CULLIN.

CERTIFICATE OF CORRECTION.

Patent No. 2,128,454.   August 30, 1938.

JASPER F. CULLIN.

It is hereby certified that error appears in the printed specification of the above numbered patent requiring correction as follows: Page 2, first column, line 68, for the word "clearness" read clearance; page 3, first column, line 74, for the reference numeral "22" read 22'; and that the said Letters Patent should be read with this correction therein that the same may conform to the record of the case in the Patent Office.

Signed and sealed this 11th day of October, A. D. 1938.

Henry Van Arsdale (Seal)

Acting Commissioner of Patents.